United States Patent [19]

Watanabe

[11] 4,408,310

[45] Oct. 4, 1983

[54] SIMPLIFIED SOUND REPRODUCING DEVICE DRIVEN BY A SPRING MOTOR

[75] Inventor: Katsumi Watanabe, Kawasaki, Japan

[73] Assignee: Ozen Corporation, Tokyo, Japan

[21] Appl. No.: 288,655

[22] Filed: Jul. 30, 1981

[30] Foreign Application Priority Data

Mar. 25, 1981 [JP] Japan .................................. 56-43676

[51] Int. Cl.³ ...................... G11B 17/00; G11B 31/00; G11B 3/00
[52] U.S. Cl. ....................................... 369/41; 369/31; 369/65; 369/67
[58] Field of Search .......................... 369/65, 67, 31, 41

[56] References Cited

U.S. PATENT DOCUMENTS

| 3,383,114 | 5/1968 | Ryan ..................................... | 369/31 |
|---|---|---|---|
| 3,468,546 | 9/1969 | Duncan et al. ....................... | 369/65 |
| 3,529,832 | 7/1970 | Goetz et al. .......................... | 369/31 |
| 3,658,346 | 4/1972 | Stern et al. ............................ | 369/65 |
| 3,711,964 | 1/1973 | Folson et al. ......................... | 369/31 |
| 3,738,195 | 6/1973 | Stern et al. ............................ | 369/65 |
| 3,741,566 | 6/1973 | Baynes et al. ........................ | 369/31 |
| 4,150,831 | 4/1979 | Watanabe ............................. | 369/67 |
| 4,198,057 | 4/1980 | Miuya .................................. | 369/67 |
| 4,347,595 | 8/1982 | Ngai ..................................... | 369/67 |

FOREIGN PATENT DOCUMENTS 706868 12/1979 U.S.S.R. ................................ 369/65

Primary Examiner—Steven L. Stephan
Attorney, Agent, or Firm—Basile, Weintraub & Hanlon

[57] ABSTRACT

A winding knob and a winding wheel for winding a drive spring are received in alignment around and along the center shaft and are capable of being coupled together in both directions of winding and their axial movement. A reverse slippage restraining post or plunger is disposed between the winding wheel and a record disc axially movable along the center shaft. The record disc is resiliently urged toward a pickup.

The reverse slippage restraining post or plunger engages a locking piece provided on the record disc when it is pushed forward by the winding wheel when the winding knob is pushed forward in its first winding, while it is pushed back when the record disc is moved away from the record disc by the depression of a starting post, and is released from the engagement with the locking piece to permit rotation of the record disc when the record disc reverts back to its undepressed position when the depression on the start post is released.

In order to stop any idling rotation of the record disc immediately after the completion of one sound reproduction of the record disc, a rotatable pawl member and a fixed pawl member are disposed, respectively, on the record disc or a turn table and the casing.

4 Claims, 3 Drawing Figures

SIMPLIFIED SOUND REPRODUCING DEVICE DRIVEN BY A SPRING MOTOR

BACKGROUND OF THE INVENTION

1. Field of the Invention

This invention relates to a simplified sound reproducing device driven by a spring motor, and more particularly, to a device for starting and stopping rotation of a record disc.

2. Description of the Prior Art

Hitherto, many of the simplified sound reproducing devices driven by a spring motor have used a constant torque spring motor which adoped a so-called pull string type winding system. These kinds of devices have been widely used because the pulling string used as a winding means can be wound tightly to be received within the device and is advantageous in making the device compact, and at the same time, winding of the power spring can be done by the very simple action of pulling a string.

It has been long desired to incorporate simplified sound reproducing devices which utilize winding knob for winding a constant torque spring into various devices, particularly, into talking dolls or the like.

In these cases, however, as the record disc is housed in a casing, it is impossible to wind the spring of the motor without holding the wheel as in the case of toy motor car so as to prevent reverse slippage of the wheel.

In order to prevent such reverse slippage or uncoiling of the spring, the use of a ratchet was thought available, but the use of such ratchet means requires another means for unlocking the ratchet during playing which makes the construction of the device as a whole considerably complicated in connection with the necessity for providing a device for starting sound reproduction.

Furthermore, there arises another problem of unnecessary wear of the reproducing stylus during its prolonged idle running unless the completion of sound reproduction is synchronized with the completion of one sound reproduction of the record disc.

Also if the winding is done during and after the playing, it would be accompanied by undesirable rotation of the record disc.

These troubles were found also in the pull string type devices and have long been desired to be solved.

SUMMARY OF THE INVENTION

The present invention aims to solve such pending problems encountered in the simplified sound reproducing device of this kind.

Accordingly, an object of this invention is to provide a simplified sound reproducing device driven by a spring motor using a winding knob.

Another object of the present invention is to provide a simplified sound reproducing device driven by a spring motor but free from any reverse slippage and idle running while the winding knob is being operated.

A further object of the present invention is to coincide both the completion of the sound reproduction of the spring deiven type simplified sound reproducing device and the end of rotation of the record disc in a synchronised manner to thereby to prevent any undesirable wear of the reproduction stylus.

A still further object of the present invention is to simplify the devices for initiating and stopping the record disc driven by the constant torque spring motor to thereby assure firm function with strong construction.

According to the present invention, a winding knob and a winding wheel are received around a center shaft such that they can both be coupled together for axial movement and rotation.

Also a reverse slippage restraining post or plunger is disposed between the winding wheel and the record disc which is movable along a center shaft and is always resiliently urged toward a pickup.

This reverse slippage restraining post or plunger is pushed upward by the winding wheel initiated by the turning of the winding knob while the pickup is being played and thereby engages the locking piece formed on the reverse face of the turn table.

By depression of a starting post, the record disc is pushed downward and away from a pickup. At that time, the reverse slippage restraining post or plunger is pushed back.

When the starting post is released from the depression accompanying reverting of the record disc to the position for starting, the reverse slippage restraining post of plunger is released from engagement with the locking piece thereby permitting rotation of the record disc for subsequent playing. There is provided a couple of claw members which engage together and stop the rotation of the record disc when the reproduction stylus enters the recessed portion formed at the end point of sound reproduction accompanying advance movement of the record disc.

Accordingly, it becomes possible even for a simplified sound reproducing device driven by a spring motor to eliminate prolonged idle running after the completion of sound reproduction which heretofore has resulted in unnecessary wear of the reproduction stylus as well as any reverse slippage of the winding device during its winding.

All of the components or parts for accomplishing the above-mentioned function, such as a winding knob, a winding wheel, a reverse slippage restraining post or plunger which locks rotation of the record disc or releases it by its axial movement caused by the winding wheel and the record disc, a locking piece integrally formed on the back face of the record disc, stopper claw members, and starting poles, are very simple in construction.

Accordingly, the device of the present invention functions very smoothly. Particularly, the winding operation of the device can be readily initiated merely by pushing the winding knob at its first winding step without being accompanied by an unnecessary rotation of the record disc.

DETAILED DESCRIPTION OF THE PREFERRED EMBODIMENT OF THE INVENTION

Figure 1:
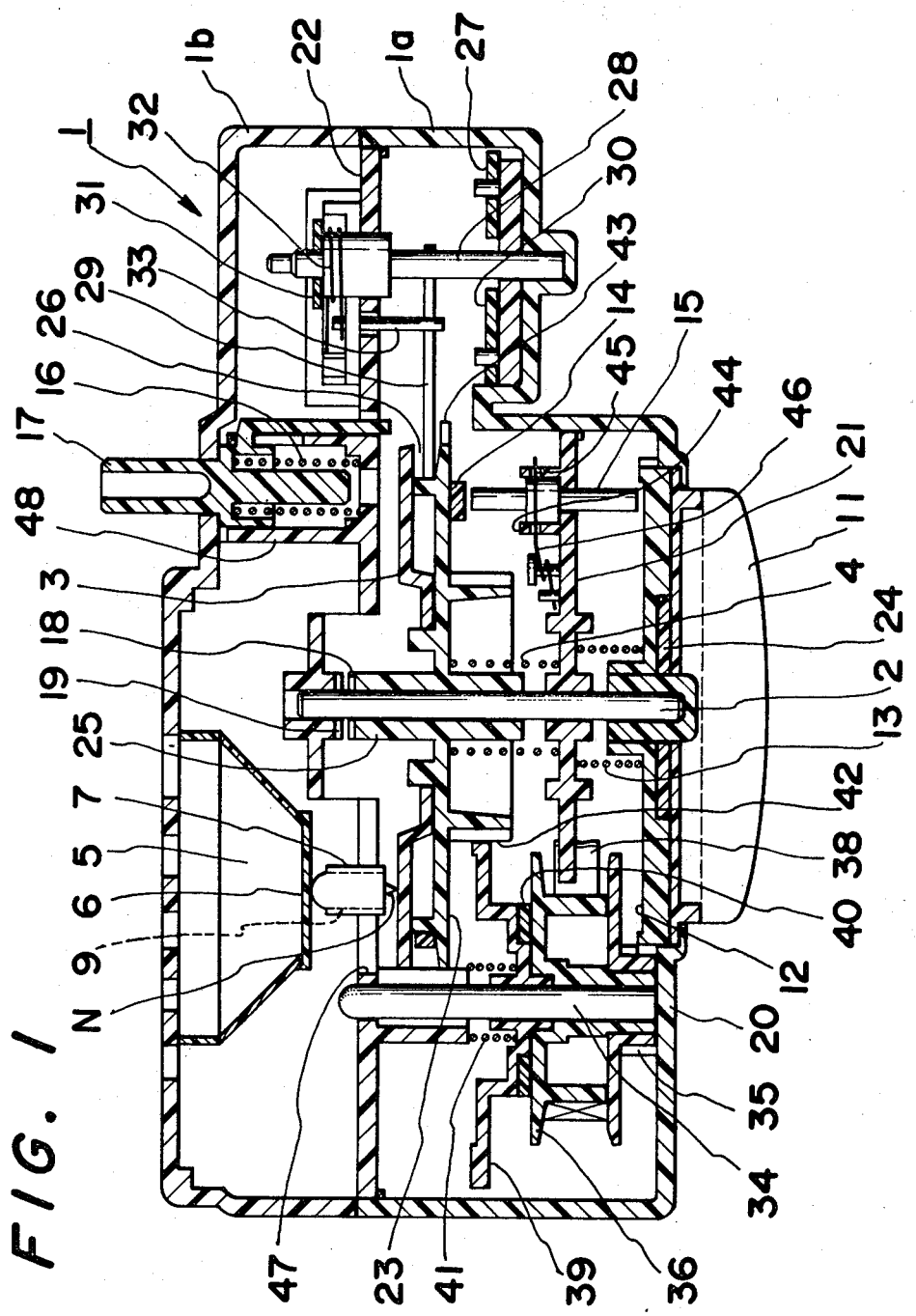
FIG. 1 is a cross sectional elevational view of an embodiment of the present invention.
Figure 2:
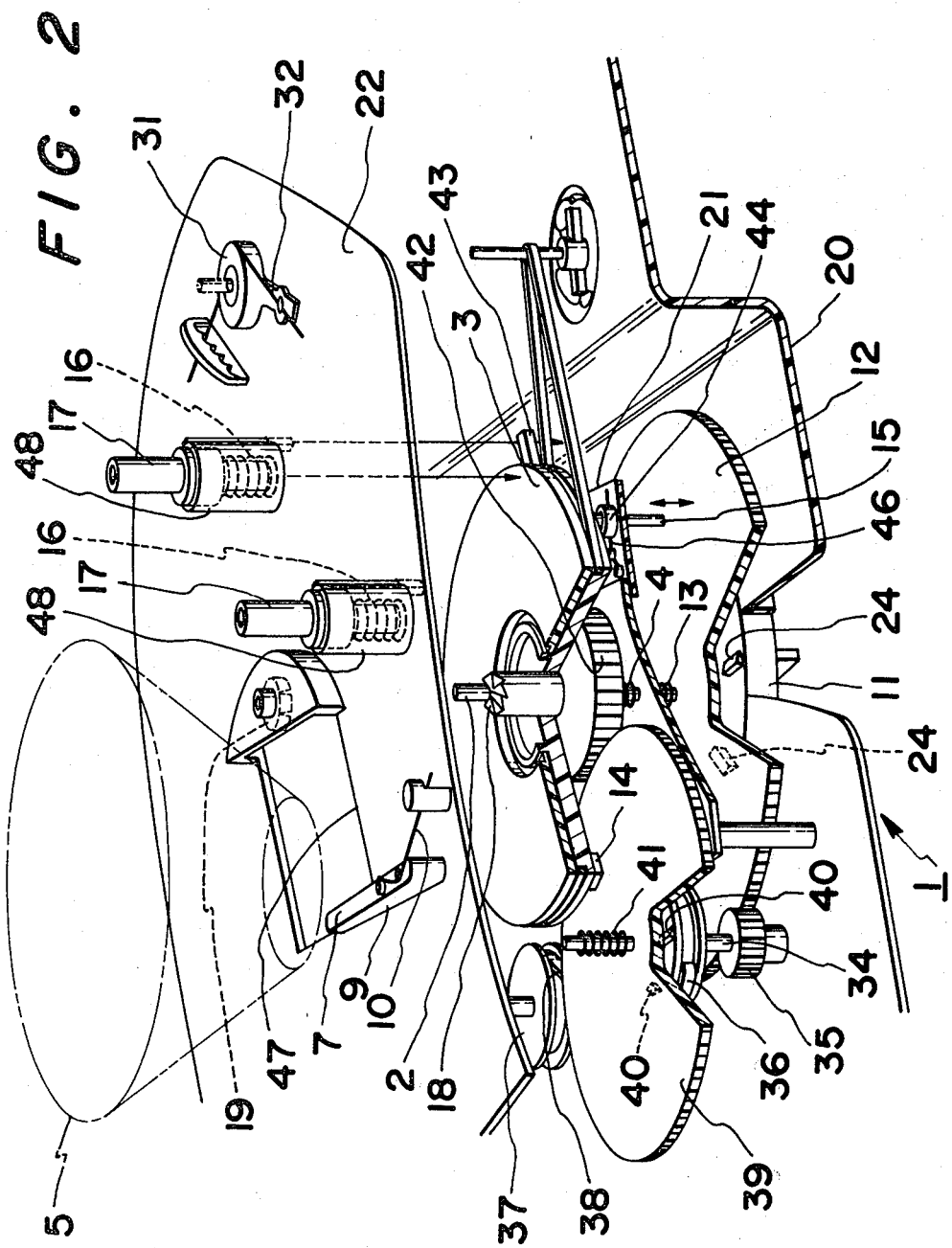
FIG. 2 is a partly fragmented, perspective illustration with the housing and front side wall being removed.

As shown in FIGS. 1 and 2, a casing 1 consists of a chassis 1a and a housing 1b.

The chassis 1a has a winding knob 11 which has a circular disc shape and is inserted into a base plate 20. The winding knob 11 is capable of being advanced or retracted, namely, upward or downward, respectively in the drawings.

A middle plate 21 and a front plate 22 are also attached to the chassis 1a.

At the center of the winding knob 11, a center shaft 2 is disposed upright and is received at its lower end by a cup-shaped thrust bearing against the thrust force exerted thereto. The center shaft 2 extends upward passing through the middle plate 21 and the top end of the center shaft is journally received by the front plate 22, and is capable of being moved in both advancing and retracting directions.

Around the center shaft 2 and below the middle plate 21, a toothed winding wheel 12 is inserted which is capable of being rotated and axially moved.

Around the center shaft 2 a turn table 23 which tightly holds a record disc 3 and is capable of being rotated and axially moved integrally with the record disc is interposed between the upper plate 22 and the middle plate 21 and is permitted for both rotational and axial movement.

Between the opposing faces of the winding wheel 12 and the winding knob 11, a first ratchet 24 is interposed for coupling both members when the winding knob is turned in the direction of winding the constant torque spring.

A third spring 13 is disposed under compression between the middle plate 21 and the winding wheel 12 for biasing both the winding wheel 12 and winding knob 11 together toward the direction of their retraction so that they can engage the first ratchet 24.

The central part of the turn table 23 is formed to constitute a hollow cylindrical shaft 25, the tip end of which forms an annular stopper pawl member 18 which is able to engage a mating stopper pawl body 19 formed on the back face of the front plate 22 so as to lock the turn table 23 from its rotation.

The turn table 23 is also resiliently urged toward its advancing (upward) direction by a first spring 4 disposed under compression between the middle plate 21 and the turn table 23.

The record disc 3 has an annular central recess along the inner periphery of which an upright annular boss of the turn table 23 is tightly inserted to assure rotation and axial movement of the record disc 3 together with the turn table 23.

Figure 3:
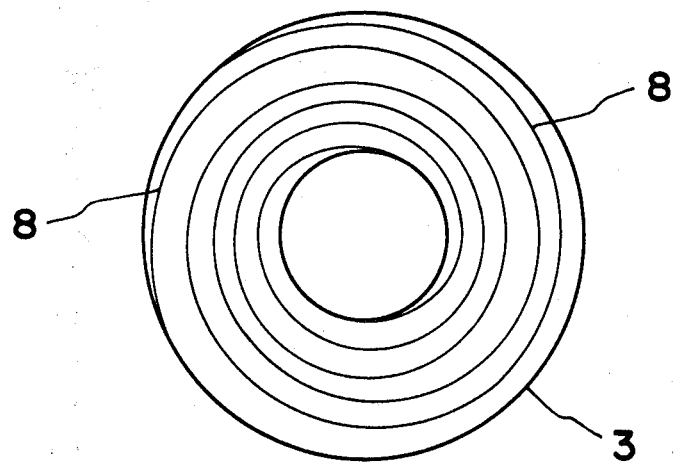
FIG. 3 is a plan view of a record disc.

As shown in FIG. 3, the record disc 3 has two sound grooves 8.

The outer periphery of the turn table 23 and the reverse face of the record disc 3 define a pulley groove 26.

On the chassis 1a at a position alongside and downward of the pulley groove 26, a governor 27 is provided which is rotated by the turn table 23 through a belt 29 extending around and between a shaft 28 and the pulley groove 26.

During rotation a governor piece 30 frictionally engages the inner wall of the chassis 1a and slows down the excessively fast rotation of the record disc 3.

The shaft 28 of the governor 27 is journally received in the front plate 22 and the tip end of the shaft 28 has an auxiliary governor 31 having a rod 33 which resiliently and frictionally contacts the belt 29 in a manner which can be adjusted by changing the extent of the turns of the sixth spring 32 around the shaft 28.

On the base plate 20 of chassis 1a and alongside the winding wheel 12, an upstanding shaft 34 of a drive system is disposed around which a toothed winding follower wheel 35 is rotatably received and meshed with the toothed winding wheel 12.

The toothed winding follower wheel 35 has a tooth face width sufficient for permitting some extent of axial movement, namely, the axial shift of the winding wheel 12.

A reel 36 for taking up a constant torque spring is coaxially attached into and above the winding follower wheel 35.

As particularly shown in FIG. 2, on the chassis 1a a pay-off reel 37 is also provided from which a constant torque spring 8 is paid off and wound around the take-up reel 36.

On the front face, namely, on the upper face of the take-up reel 36, a toothed drive wheel 39 is coaxially received.

Between the drive wheel 39 and the take-up reel 36 a ratchet 40 is interposed which functions such that the take-up reel 36 and the drive wheel 39 do not engage when the take-up reel 36 turns in the taking up direction but are coupled together in the direction of driving.

A seventh spring 41 is disposed under compression between the front plate 22 and the drive wheel 39 such that the drive wheel 39 always resiliently contacts the take-up reel 36.

A toothed follower wheel 42 is integrally formed on the center part of the turn table 23 to mesh with the drive wheel 39.

The follower wheel 42 is formed to have its tooth face width long enough to maintain engagement with the drive wheel 39 when the follower wheel 42 is axially shifted.

At a suitable position on the reverse face of the turn table 23, a locking piece 14 is disposed to project toward the middle plate 21.

The turn table 23 also has, on its outer side face, a projection 43.

The middle plate 21 has, on a position alongside the center shaft 2, an integrally formed annular sleeve 44 parallel to the center shaft 2. Into the annular sleeve 44 and passing through the middle plate 21, a reverse slippage restraining post or plunger 15 is inserted and held; while its axial movement along the annular sleeve is still allowed.

The reverse slippage restraining post or plunger 15 has a length larger than that of the annular sleeve 44 and the front (upper) tip end and rear (lower) tip end of the post 15, respectively, confront the reverse face of the turn table 23 and the front face of the winding wheel 12 and are spaced apart at a distance smaller than the axial stroke of movement of the above-mentioned two members.

The annular sleeve 44 has at its side face a transverse cut-away slit 45 opened upto the interior of the sleeve 44, through which slit 45 the fifth wire spring 46 is extended to resiliently hold the side face of the reverse slippage restraining post or plunger 15 such that the post or plunger 15 is enabled to maintain its certain axial position within the sleeve 44.

The fifth spring 46 is turned around a post disposed on the front face of the middle plate 21 and further extends to pass through the transverse slit 45 as already mentioned.

On the front face of the front plate 22, a tone arm 9 carrying a pickup 7, which is normally urged by a second spring 10 to move in a direction toward the starting point of sound reproduction and away from the face of the record disc 3, is swingably attached.

Reference numeral 47 in the drawings denotes an aperture or opening for allowing swing motion of the pickup.

As can be particularly seen in FIG. 1, a speaker cone 5 having a vibration plate 6 at its bottom is tightly fixed within the housing 1b such that said vibration plate 6 engages the head, namely, the reverse side of the pickup.

A sound reproducing stylus N extends through the aperture 47 and engages the record disc 3.

A pair of starting posts 17 corresponding to the number of recorded grooves are disposed on the front plate 22 alongside and parallel to the center shaft 2.

The starting posts 17 are received in a sleeve 48 permitted for axial reciprocal movement and are normally urged by fourth spring 16 to move away from the record disc 3.

One end of each starting post 17 projects upward beyond the front face of the housing 1b and the other end thereof passes through the front plate 22 and engages the record disc 3 to let it retract when any one of the starting posts 17 is selected and depressed for the next playing against the resilient force imparted by the fourth spring 16.

Each starting post 17 has, at its side face, a branched parallel pole which projects in parallel downward and passes immediately beside the side face of the turn table 23 upto the position to engage the projection 43 and plays a role as a locking post, when the starting post 17 is depressed.

The device of the present embodiment can be operated in the following manner.

FIG. 1 shows the device of this invention in the sound reproduction mode.

When the device completes playing, the stylus N comes to the end point of sound reproduction, that is, to the recessed portion at the central portion of the record disc 3. Then, the record disc 3 is allowed to advance (upward) together with the turn table 3 by the first spring 4.

The rotatable pawl member 18 then engages the stopper pawl member 19 and stops the rotation of the turn table 23.

Next, the winding knob 11 is pushed forward when initiating winding. Then, the winding wheel 12 contacts the reverse slippage restraining post 15 and urges it forward (upward) until it abuts the reverse face of the turn table 23.

In this position, the winding wheel 12 is coupled with the winding knob 11 through the ratchet 24 so as to be rotated in the direction of winding.

Rotation of the winding wheel 12 gives rise to the rotation of the follower wheel 35, and in turn, rotation of the take-up reel 36 and enables the first winding of the constant torque spring 38. During this operation, the winding follower wheel 35 does not accompany rotation of the drive wheel 39 by virtue of the ratchet 40. In this way, further winding can proceed.

Pushing down of the starting post 17 corresponding to the recorded groove to be played next, upon completion of the winding, will make the record disc 3 move in the direction of its retraction and the rotatable pawl member 18 is released from the engagement with the stopper pawl member 19 and permits rotation of the record disc 3 together with the turn table 23.

The drive wheel 39 begins to rotate by the constant torque spring motor through the ratchet 40 which in turn, rotates the follower wheel 42 and the turn table 23.

At the same time the pickup 7 returns to the starting point of sound reproduction.

At this position, the locking pole formed integrally with the starting post 17 still engages the projection 43 of the turn table 23 such that the selected groove 8 of the record disc is positioned to be engageable with the reproduction stylus N of the pickup 7.

Removal of the operator's hand from the starting post 17 allows axial forward movement of the record disc 3 and thereby imparts stylus force to the stylus N sufficient to start a desired sound reproduction upon rotation of the record disc 3.

If the winding knob 11 is pushed forward during the playing, the reverse slippage restraining post 15 will engage the locking piece 14 disposed on the reverse face of the turn table 23 and stop rotation of the turn table 23 and record disc 3.

At this position, the rotatable pawl member 18 and the stopper pawl member 19 are still in a separated state, but the engagement of the reverse slippage restraining post 15 with the locking piece 14 permits further winding without causing any undesirable reverse slippage of the winding means.

I claim:

1. A simplified sound reproduction device driven by a spring motor comprising:
 a casing;
 an upright center shaft disposed within the casing;
 a record disc rotatably and axially movably disposed for advanced and retracted movement about the center shaft, the record disc having a recessed central portion and a recorded face with starting and end points of sound reproduction, the record disc being received and supported by the center shaft;
 first spring means disposed about the center shaft for biasing the record disc to its advanced position along the center shaft;
 a speaker cone mounted within the casing;
 a vibration plate mounted at the bottom of the speaker;
 a tone arm swingably mounted on the casing;
 second spring means for biasing the tone arm away from the record disc and towards the starting point of sound reproduction;
 a pickup carried by the tone arm;
 a sound reproducing stylus carried by the pickup;
 means for stopping rotation of the record disc when the stylus reaches the end point of sound reproduction;
 a winding knob reciprocally movable along the center shaft and rotatable between winding and retracted positions;
 a winding wheel reciprocally movable and rotatably disposed about the center shaft and adapted to be coupled and rotatable with the winding knob upon depression of the winding knob and rotation of the winding knob only in the direction of winding the spring motor to wind the spring motor;
 third spring means for biasing the winding knob and the winding wheel to the retracted position;
 at least one starting post disposed parallel to the center shaft and being axially movably disposed within the casing;
 fourth spring means for biasing the starting post away from the record disc;
 the starting post, when depressed, engaging and moving the record disc to its retracted position;

means for temporarily stopping rotation of the record disc including:

a locking member affixed to the face of the record disc opposite from the recorded face;

a reverse slippage restraining post mounted in the casing and disposed betwen the winding wheel and the record disc, the reverse slippage restraining post being axially movable and adapted to be moved into engagement with the locking member when engaged and axially advanced by the winding wheel for temporarily stop plug rotation of the record disc, the reverse slippage restraining post disengaging from the locking member by movement of the record disc towards its retracted position.

2. The simplified sound reproducing device as claimed in claim 1 wherein the means for stopping rotation of the record disc at the end of sound reproduction comprises:

a rotatable pawl member supported by the center shaft, the rotatable pawl member being rotatably and reciprocally coupled with the record disc for movement between advanced and retracted positions;

a stationary pawl member fixedly disposed in the casing for stopping rotation of the record disc by engagement with the rotatable pawl member at its advanced position; and the record disc having a recessed central portion which receives the stylus at the end point of sound reproduction such that the first spring means urges the record disc to its advanced position.

3. The simplified sound reproducing device as claimed in claim 1 wherein the record disc includes a plurality of record grooves and the device includes a plurality of starting posts corresponding to the number or record grooves.

4. The simplified sound reproducing device as claimed in claim 1 further including:

a sleeve fixedly mounted in the casing;

the reverse slippage restraining post being movably disposed within the sleeve; and fifth spring means for resiliently and movably supporting the reverse slippage restraining post within the sleeve.

* * * * *